UNITED STATES PATENT OFFICE.

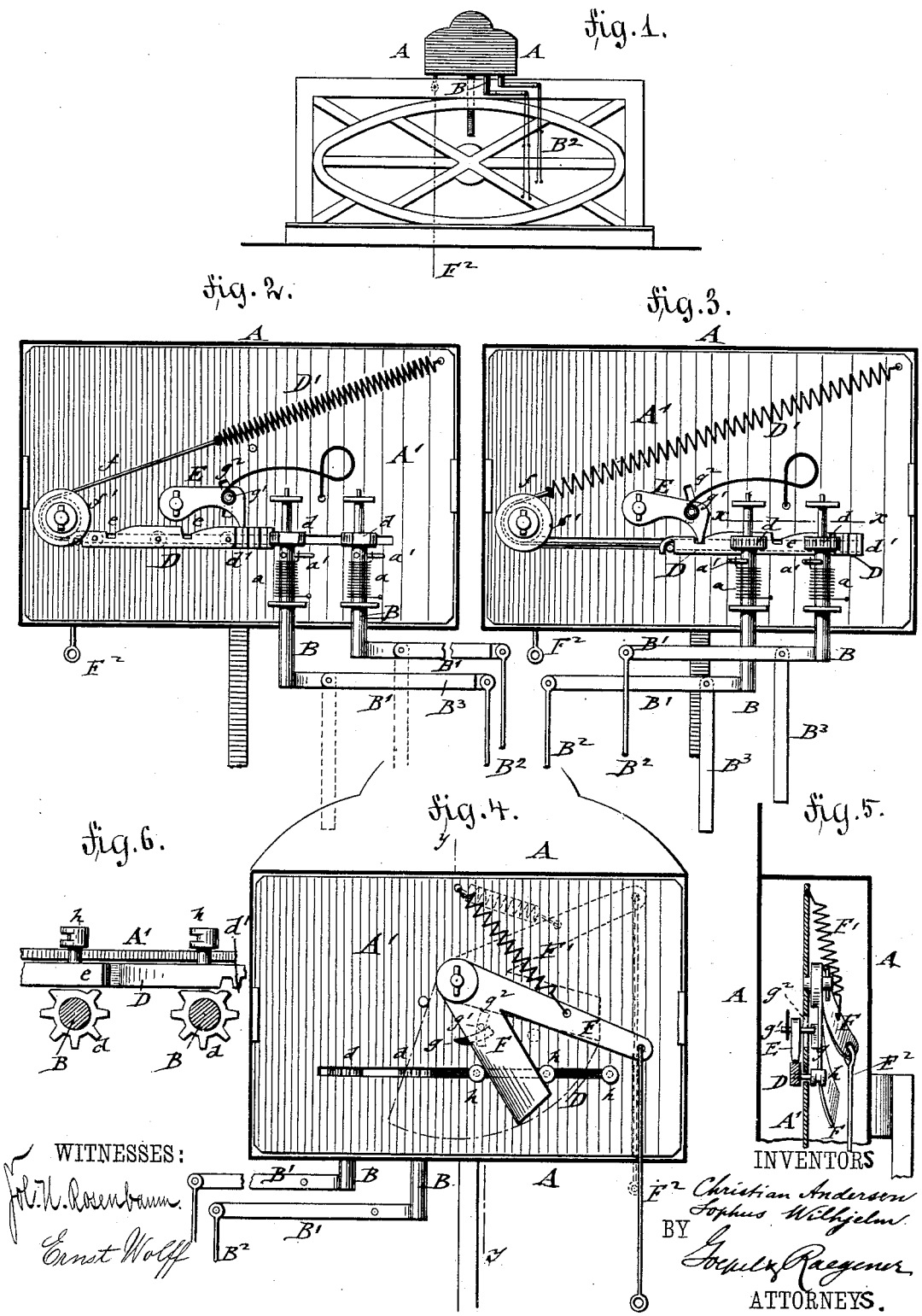

CHRISTIAN ANDERSEN AND SOPHUS WILHJELM, OF BROOKLYN, NEW YORK.

MUSIC-LEAF TURNER.

SPECIFICATION forming part of Letters Patent No. 332,579, dated December 15, 1885.

Application filed February 17, 1885. Serial No. 156,141. (No model.)

*To all whom it may concern:*

Be it known that we, CHRISTIAN ANDERSEN and SOPHUS WILHJELM, both of Brooklyn, in the county of Kings and State of New York, have invented certain new and useful Improvements in Music-Leaf Turners, of which the following is a specification.

This invention has reference to a music-leaf turner of simple construction that is attached to the rack of a piano or music-stand, and that is adapted to turn the music-sheets in one or the opposite direction.

The invention consists of a music-leaf turner, the leaf-holding fingers of which are attached to axially-turning and spring-actuated rods that are provided with mutilated pinions, which are engaged and locked by a horizontally-guided reciprocating rack-bar. The rack-bar is moved intermittently in one direction by an oscillating bell-crank lever that engages backwardly-projecting pins of the rack-bar, and in opposite direction by a spiral spring, pulley, and cord attached to the rack-bar, which is locked by a spring-pawl that is released by the bell-crank lever whenever the rack is operated for turning the music-sheets.

In the accompanying drawings, Figure 1 represents a front elevation of the music-rack with my improved music-leaf turner arranged in position thereon. Figs. 2 and 3 are front views of the same, with the face-plate removed, showing the leaf-turning fingers before and after turning the leaves. Fig. 4 is a rear view of the actuating mechanism of the leaf-holding fingers. Fig. 5 is a vertical transverse section on line $y\ y$, Fig. 4; and Fig. 6 a detail horizontal section on line $x\ x$, Fig. 3.

Similar letters of reference indicate corresponding parts.

Referring to the drawings, A represents the casing of our improved music-leaf turner, which is attached to the rack of a piano or a music-stand.

In suitable bearings of the casing A are arranged a number of axially-turning rods, B B, that are provided at their lower ends outside of the casing A with laterally-extending arms B', to which the leaf-holding fingers $B^2$ are pivoted. Each arm B' is preferably provided with two pivoted fingers, $B^2$, between which the leaf to be turned is placed. Two shorter fingers, $B^3$, are pivoted to the arms B', and are used in connection with the longer fingers $B^2$ when loose single leaves have to be turned. The fingers $B^2$ are preferably made of two sections, so as to be capable of being folded into smaller space when the music-leaf turner is packed away in its box. The rods B are turned in their bearings by means of spiral springs $a\ a$, that are attached at one end to the casing A and at the other end to fixed pins $a'$ of the rods B B, as shown in Figs. 2 and 3.

To the rods B are further applied pinions $d\ d$, which are engaged by a short rack, $d'$, at the end of a bar, D, that is guided in a slot of the partition A' of the casing A. The teeth of the pinions $d\ d$ are cut away at one side, so as to form contact with the slide-bar D when the cut-away sides face the bar D, whereby their turning is prevented until re-engaged by the rack, as shown in Fig. 6. The rack is adapted to engage one of the pinions after the other, so as to turn one of the leaf-holding fingers after the other. When the rods B are released from the rack of the slide-bar D, their springs return them in the other direction, so as to bring the fingers back into their former position. A spring-actuated pawl, E, engages notches $e\ e$ of the slide-bar D. The slide-bar D is moved in one direction by a spiral spring, D', which is attached to a cord, $f$, that is passed over a pulley, $f'$, at the interior of the casing, and connected to the end of the slide-bar, as shown in Figs. 2 and 3.

To the rear part of the partition-plate A' is fulcrumed an elbow-lever, F, which is moved in one direction by a spiral spring, F', and connected to a lever, rod, or cord, $F^2$, that is connected to the treadle of the music-stand or to a lever at the bottom of the piano, so that the elbow-lever F can be easily operated by the foot or knee. The lower arm of the elbow-lever F engages by a cam, $g$, a pin, $g'$, of the pawl E, which pin passes through a curved slot, $g^2$, of the partition-plate A', so as to project into the path of the cam $g$. The lower end of the elbow-lever F engages one of the rearwardly-projecting pins $h\ h$ of the slide-bar D, and moves thereby the slide-bar forward against the tension of the spring D', so that the rack $d'$ engages the pinion $d$ of the first rod, B, and turns thereby quickly the finger and the music-leaf. By the second downward motion of the elbow-lever F the next pin $h$ is engaged, the slide-bar D moved forward, and the next rod, B, turned by the rack $d'$, whereby the next sheet is turned over, and so on until all the sheets are turned.

In turning the music-leaves in the direction described care has to be taken that the elbow-lever F is moved downward far enough until the spring-pawl E drops into one of the notches $e$ of the slide-bar D. The elbow-lever F is then returned by the action of its spiral spring F', its lower arm being slightly bent up at the rear part, as shown in Figs. 4 and 5, so that it passes readily over the next pin without being stopped by contact with the same. The click caused thereby by the elbow-lever indicates that the elbow-lever has returned to its normal position, ready for the next motion.

For turning the sheets in opposite directions the elbow-lever F is moved down, but only far enough to release the spring-pawl E by its cam $g$. The spiral spring D' moves thereby the slide-bar D in opposite direction until the spring-pawl E drops into the next notch, $e$. The rack of the slide-bar D engages thereby successively the pinions of each rod B, and turns thereby the fingers and sheets. The spiral springs $a$ on the shanks assist in turning the rods B, while the pins $a'$ abut against the partition A' and serve to stop the axial motion of the rods in either direction.

The different degrees of motion to be imparted to the elbow-lever, so as to cause the turning of the leaves either in forward or backward direction, is readily acquired, as in one case the click of the pawl has to be secured first before releasing the elbow-lever, while in the other case only the spring-pawl has to be released without moving the slide-bar against the tension of its spring.

In the drawings two leaf-turning fingers are shown; but it is obvious that any number of them can be arranged, in which case the slide-bar D is extended and provided with as many notches as there are fingers.

Our improved music-leaf turner has the advantage that it is of simple and cheap construction and can easily be thrown into action in one or the opposite direction as required by the music to be played.

Having thus described our invention, we claim as new and desire to secure by Letters Patent—

1. The combination of axially-turning rods having sheet-holding fingers and pinions, a guided and spring-actuated slide-bar having a rack at the outer end, a spring-pawl engaging notches of said slide-bar, and a fulcrumed and spring-actuated elbow-lever that is attached to the rear part of the partition of the casing and adapted to engage pins of the slide-bar, so as to move the slide-bar forward for turning one finger after the other, substantially as set forth.

2. The combination of axially-turning and spring-actuated rods having fixed pinions, cut away at one side, arms having leaf-holding fingers, a guided and spring-actuated slide-bar having a rack at the outer end for engaging said pinions, a spring-pawl adapted to engage notches of the slide-bar and having a projecting pin, and a fulcrumed and spring-actuated elbow-lever having a cam engaging the pin of the spring-pawl, so as to release the spring-pawl and cause the return motion of the leaf-holding fingers, substantially as set forth.

3. The combination of axially-turning rods, sheet-holding fingers connected to said rods, pinions keyed to said rods and cut away at one side, a guided and spring-actuated slide-bar having notches, projecting pins, and a rack at the outer end, a spring-pawl having a projecting pin, a fulcrumed and spring-actuated elbow-lever having a fixed cam and a bent-up lower arm, whereby the spring-pawl is released and the slide-bar moved in one or the opposite direction, substantially as set forth.

In testimony that we claim the foregoing as our invention we have signed our names in presence of two subscribing witnesses.

CHRISTIAN ANDERSEN.
SOPHUS WILHJELM.

Witnesses:
PAUL GOEPEL,
SIDNEY MANN.